May 4, 1954   J. F. KIRKBRIDE ET AL   2,677,512
AIRCRAFT FLAP CONTROL
Filed April 9, 1952   4 Sheets-Sheet 1

John F. Kirkbride &
Calvin Edwin Pfafman
INVENTORS.

BY *[signature]*

THEIR PATENT ATTORNEY.

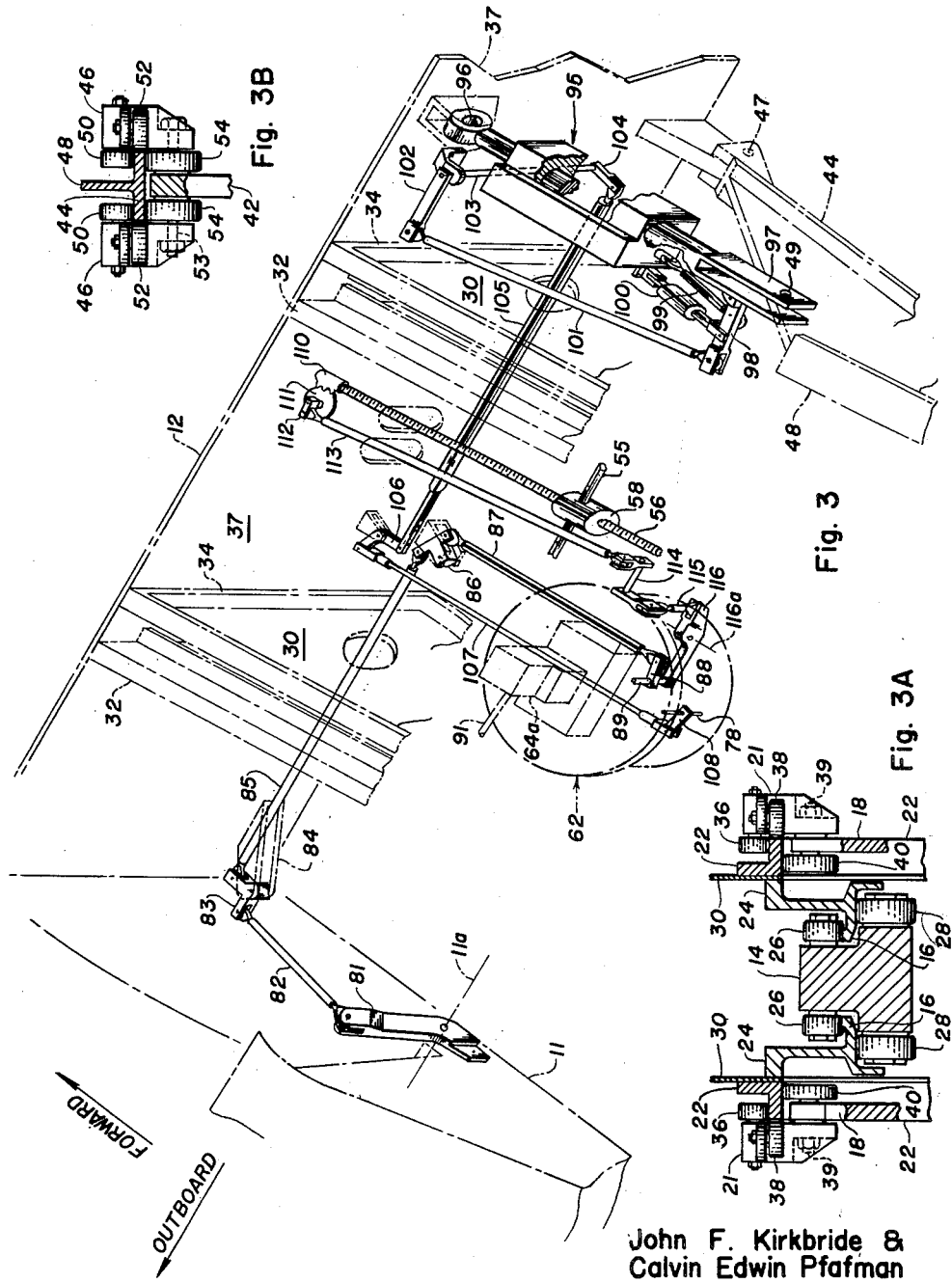

May 4, 1954　　　J. F. KIRKBRIDE ET AL　　　2,677,512
AIRCRAFT FLAP CONTROL

Filed April 9, 1952　　　　　　　　　　　　　　4 Sheets-Sheet 3

John F. Kirkbride &
Calvin Edwin Pfafman
*INVENTORS.*

BY *James M. Clark*

THEIR PATENT ATTORNEY.

May 4, 1954    J. F. KIRKBRIDE ET AL    2,677,512
AIRCRAFT FLAP CONTROL
Filed April 9, 1952    4 Sheets-Sheet 4

John F. Kirkbride &
Calvin Edwin Pfafman
*INVENTORS.*

BY *James M. Clark*

THEIR PATENT ATTORNEY.

Patented May 4, 1954

2,677,512

UNITED STATES PATENT OFFICE 2,677,512

AIRCRAFT FLAP CONTROL

John F. Kirkbride, Kirkland, and Calvin E. Pfafman, Seattle, Wash., assignors to Boeing Airplane Company, a corporation of Delaware Application April 9, 1952, Serial No. 281,402

10 Claims. (Cl. 244—42)

The present invention relates to aircraft controls and more particularly to improvements in mechanisms for coordinating flap and aileron movements for augmenting lateral control of the aircraft at low speeds.

The lateral control means, such as ailerons and similar devices, of modern aircraft designed for relatively high speeds are necessarily relatively less effective at lower speeds such as during take-off and landing, and also in stalled flight. It is however necessary that the airplane be capable of landing at speeds which are not excessively greater than the landing speeds of older type aircraft. As a result of this increasing differential between the maximum flight speed and the landing speed, which differential has increased materially in recent years, it has become considerably more difficult to provide an airplane with adequate lateral control and stability at lower speeds, such as during landing operations. This is particularly so in the case of lateral control devices disposed on highly sweptback wings, and particularly as a result of the effects of runway crosswinds or rolling moments, requiring greater effectiveness of the lateral controls.

In co-pending application Serial No. 165,296 of applicants Van B. Butler and William H. Cook, filed May 3, 1950, covering Airplane Flap Control Mechanism, which issued December 2, 1952, as Patent No. 2,620,147, there is disclosed an improved flap control mechanism which is operable to control movement of the flap conjointly with the aileron, spoiler or other lateral control device which is required to be deflected upwardly in flight, for example, during landing or at other times when the flap is projected. During landing and take-off, the flaps are normally lowered to provide maximum lift, and if at that time one flap is swung toward a neutral position or "spilled" as the corresponding aileron (on the same wing) is swung upward, the lateral control effect of that aileron is greatly augmented. Under such conditions the flaps normally occupy their full downward projected positions to afford maximum lift effect, and only when the aileron is swung a predetermined amount above its neutral position will the corresponding flap be deflected or "spilled" out of its normal position, namely, upward by a related amount. Preferably the flap on the opposite wing would remain stationary under these conditions.

In one illustrated form of the composite control mechanism disclosed in the above referred to Patent No. 2,620,147, the flap is suspended by hinge supports connected to angularly controlled bell-cranks, which in turn are carried by separately guided cantilever carriage arms. The latter arms run on straight tracks for effecting bodily movements of the flap between its retracted and projected positions, generally in the chordwise direction of the wing. Preferably during its chordwise movement toward the projected position the flap is also progressively lowered by controlled rocking of the bell-cranks, causing the flap hinge axis to follow a trajectory which curves downward toward the rear. The said rocking or angle of incidence of the flap is controlled during this bodily movement by engagement between a control arm fixed to the flap nose, and a cam track of selected curved shape controlling the flap angle as a desired function of bodily position. This cam track normally occupies a fixed position relative to the wing but without severing its connection to the control arm, to which it is pivotally connected, it can be swung or otherwise shifted into different positions to "spill" or reduce the angular displacement of the flap in accordance with the desired operation of the lateral controls.

The present invention relates to an improved arrangement and mechanism for coordinating the foregoing aileron and flap movements. This invention embraces a unique clutch and disconnect unit which is interconnected with the aileron and the flap as well as the actuating means for lowering the guide track which imparts the "spilling" action to the flap. This clutch and disconnect unit is also fluidly interconnected with the hydraulic boost actuator for the aileron such that "spilling" of the flap can only be accomplished when the hydraulic boost actuator for the aileron is effective. A further interconnection of the clutch unit with the flap extension and retraction mechanism is such that the "spilling" action of the flap can only be imparted to the mechanism when the flap is in the fully extended position. The arrangement of the clutch and disconnect assembly is also such that the aileron and flap "spilling" mechanism positions are automatically synchronized when the flap is lowered and extended and the unit also provides a torque limiting means to prevent locking the aileron when the flap "spilling" drive is inoperative. The arrangement is also such that it provides an override for preventing the flap "spilling" mechanism from limiting the speed of the aileron.

In common with the above-mentioned co-pending application, it is also an objective of the present invention to provide improved flap control mechanism which supports and guides a flap for projection and retraction and which also enables the flap in its projected position to be swung in a controlled manner away from its normal or maximum angle of incidence. Another such object is to provide mechanism of this type which is simple and direct in operation, is of minimum weight and can be conveniently mounted in the aircraft wing without disturbance to the structural elements or the control parts which are located therein. Another object, in the provision of such composite control mechanism resides, in that the components controlling the angle of incidence of the flap during its projection and retraction movements also serve as the mechanical medium or coupling through which the flap angular displacement is controlled when the flap is fully projected. It is a further object of the present invention to provide improved coordinating mechanism which automatically synchronizes the aileron and flap "spilling" track positions when the flap is extended. It is also an object to provide in such mechanisms a torque limiting means which prevents locking the ailerons when the flap "spilling" drive is jammed or otherwise inoperative, and also in which there is provided an override to prevent the flap "spilling" track and its drive from limiting the speed of the aileron.

Other objects and advantages of the present invention will become apparent to those skilled in the art, after reading the following description taken in conjunction with the accompanying drawings, forming a part hereof, in which:

Fig. 3 is a perspective view of the aileron and flap coordinating mechanism shown in Fig. 1;

Fig. 3A is a sectional view of a fixed guide track for the support of the flap as taken along the lines 3A—3A of Fig. 1;

Fig. 3B is a similar sectional view of the movable guide track for "spilling" the flap as taken along the lines 3B—3B of Fig. 1;

Figure 4:
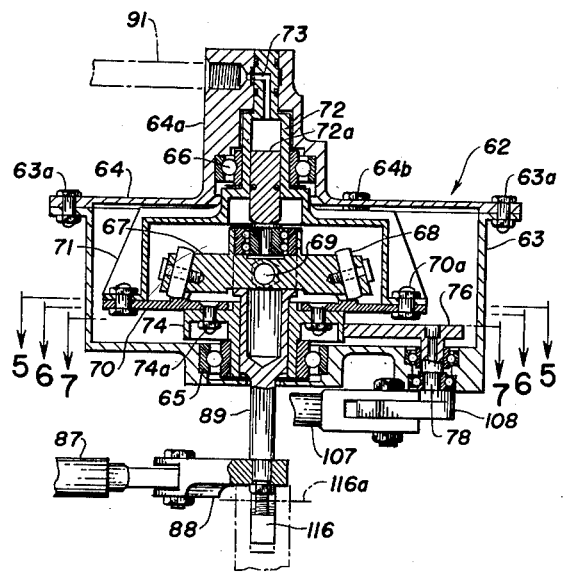
Fig. 4 is a cross-sectional view of the clutch and disconnect assembly as taken along the lines 4—4 of Fig. 1.
Figure 8:
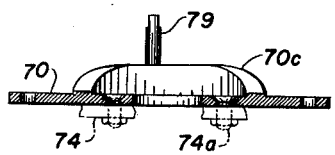
Figure 9:
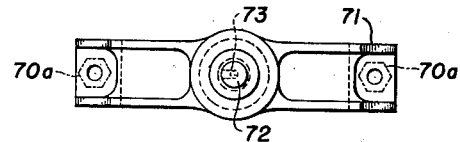
Figure 5:
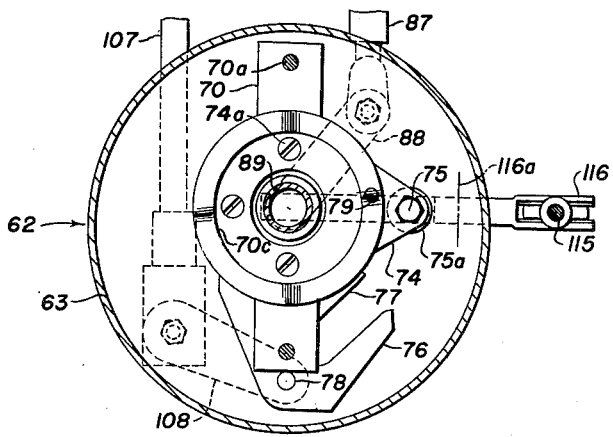
Figure 6:
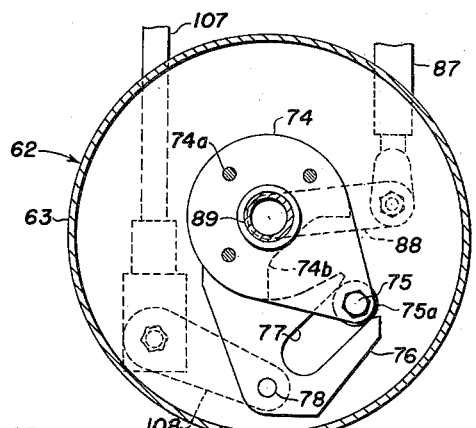
Figure 7:
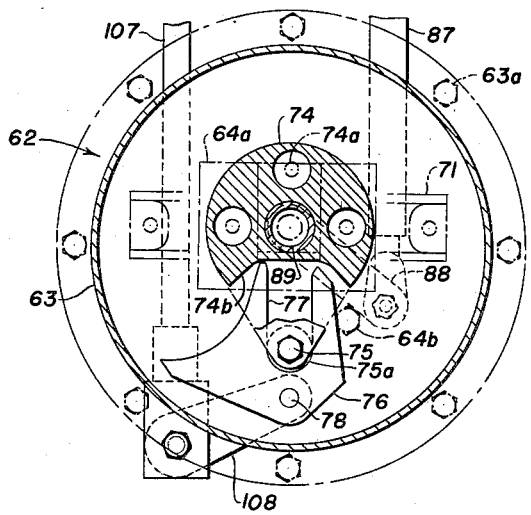

Figs. 5, 6 and 7 are sectional plan views of the same as taken along the lines 5—5, 6—6, and 7—7, respectively, of Fig. 4;

Fig. 8 is a detail view of the cam track unit of the clutch and disconnect device;

Fig. 9 is a detail view of the yoke and cylinder unit; and

Figure 10:
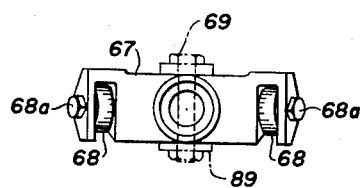

Fig. 10 is a similar view of the carriage assembly drive member.

Figure 1:
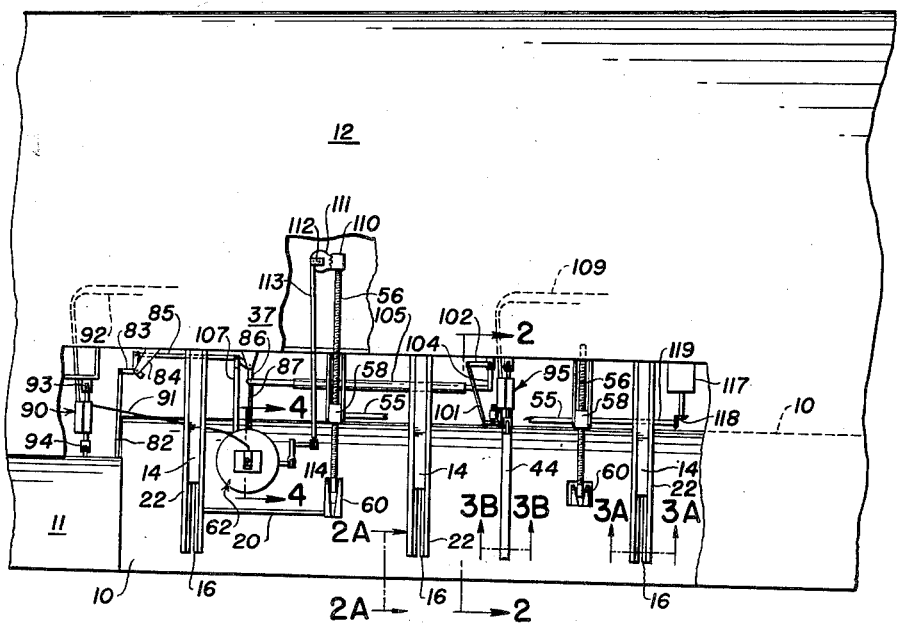
Fig. 1 is a plan view of a portion of an airplane wing embodying an aileron and flap coordinating mechanism of the improved type.
Figure 2:
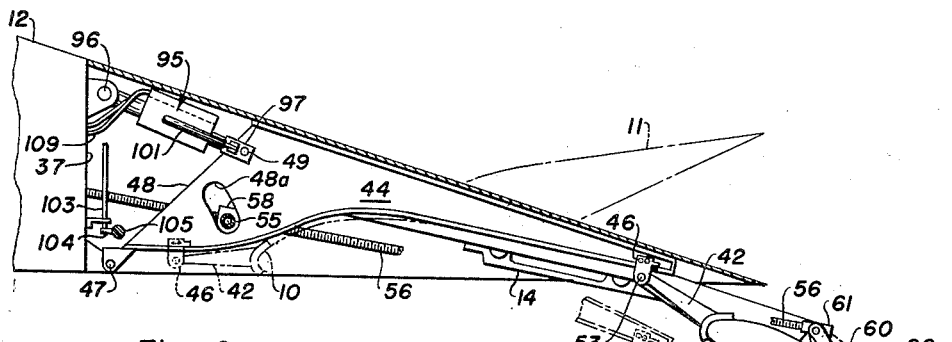
Fig. 2 is a transverse sectional view of the trailing portion of the wing as taken along the lines 2—2 of Fig. 1.

In Figs. 1 to 3, inclusive, the flap 10 is supported and guided for bodily movement to and from its retracted positions beneath the trailing edge portion of the wing 12 along a trajectory which curves downward to the rear. The aileron with which the flap 10 is coordinated is indicated by the reference numeral 11, and is disposed at the trailing edge of the wing 12 at a position outboard of that occupied by the flap, and movable about its hinge axis 11a. The flap 10 is supported principally, although not directly, from the cantilever carriage arms 14 of which a plurality are spaced spanwise of the flap and are guided within the parallel fixed straight tracks 16, as more particularly shown in detail in the section 3A. A bell-crank member 18 is disposed between the flap 10 and each cantilever carriage arm 14, being pivotally mounted thereto at the pivot 19. The bell-crank member 18 is also pivotally connected to the flap 10 at the pivotal torque tube or flap hinge 20 which is preferably disposed aft of the center of pressure of the flap 10. This disposition of the flap torque tube 20 aft of the center of pressure tends to cause the flap to be restored to its normal nose-up attitude in which it provides augmented lift and drag to the wing from which it is supported. The bell-crank member 18 is provided with a third and forwardly disposed pivotal connection at the roller fitting 21 which is guided along the curved fixed track 22.

Figure 2A:
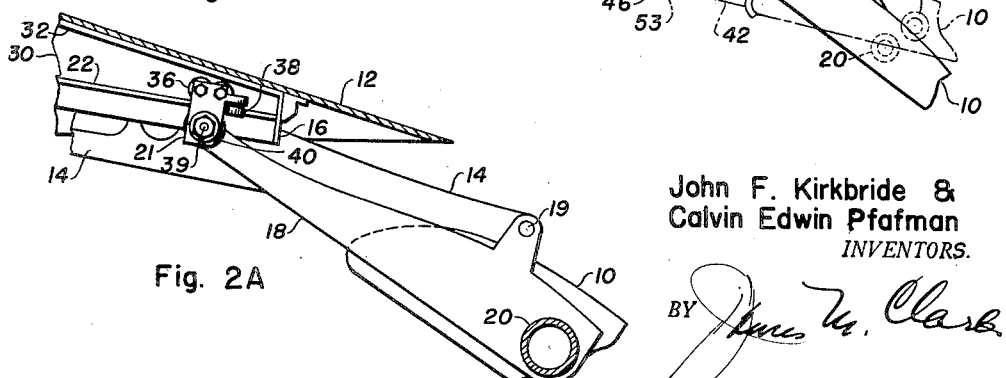
Fig. 2A is a similar view to an enlarged scale as taken along the lines 2—2 of Fig. 1.

Accordingly, it will be noted by reference to Fig. 2A that, with the flap mounting mechanism described thus far, the flap 10 is actually supported at its pivotal torque tube 20 by the bell-crank member 18 which in turn is supported by the pivot 19 at the trailing portion of the cantilever carriage arm 14; but that the bell-crank 18 is at the same time rockable about its pivotal support 19 by the curved trajectory which its forward roller fitting 21 is caused to take by the curved track 22, thereby changing the position of the flap pivot 20 with respect to the pivot 19, about which the pivot 20 is rotated. Inasmuch as the straight track 16, within which the cantilever carriage arm 14 is guided in the chordwise direction, is a fixed track as is also the curved track 22 which determines the path of the forward pivot of the bell-crank 18, the axis of the pivot 20 follows a predetermined trajectory as the axis of the pivot 19 moves rearwardly in a rectilinear path and the axis of the pivot 20 rotates in the clockwise direction downwardly about the axis of the pivot 19 in an arcuate path.

In supporting the flap 10, the base ends of the bell-cranks are rigidly connected to the torque shaft 20 which is journalled for rotation freely within the flap structure. The free aft ends of the carriage arms 14 are pivotally connected at the pivots 19 to the bell-cranks 18 at locations which are normally forward of and above the hinge axis 20 of the flap 10. In this assembled relationship of the parts, the bell-cranks 18 extend forwardly of the flap 10 to engage and be guided for movement along the curved but fixed tracks 22. These tracks 22 are of a shape and location producing rocking of the guided bell-cranks 18 on their carriage arm pivots 19 to raise and lower the flap 10 in a controlled manner relative to the straight line of movement of the ends of the carriage arms 14. Such rocking produces the desired trajectory curvature of the flap hinge axis 20 during extension and retraction. In the illustrated case, the nature of this trajectory may be seen by a comparison of the positions of the flap hinge axis in Fig. 2, wherein it appears in the retracted position and also in two projected positions in one of which it is shown in the full lines in the fully projected normal high lift position, and in the "spilled" position in construction lines.

A composite mounting structure incorporating both the carriage arm tracks 16 and the curved tracks 22 controlling the rocking of the bell-cranks 18, appears in the detail cross-section in Fig. 3A. The tracks 16 for each carriage arm 14 are of double construction, being formed by flanges of the straight structural members 24 disposed in parallel relationship, the track flanges projecting toward each other at a predetermined uniform close spacing. The base ends of the carriage arms 14 are received between these flanges and carry, at spaced intervals along their lengths, pairs of cooperative rollers, each pair including an upper roller 26 engaging the upper surface of a track flange and lower rollers 28 engaging the lower surface of the same track flange at a corresponding location. The structural track members 24 in turn are supported by a structure including parallel vertical plates 30 provided with flanges 32 (see Figs. 2A and 3) at their upper edges for attachment to the skin of the wing, and flanges 34 at their forward edges for attachment to the rear wing spar or bulkhead 37. In certain installations, it may be desirable to provide additional means of support for these plates and the attached tracks.

The curved tracks 22 guiding the forward ends of the bell-cranks 18 are formed by the outwardly projecting flanges of structural angles secured along the lower edges of the plate 30 as shown. The shape or curvature of these tracks may be readily computed to provide any of various flap axis curved trajectories according to the particular design requirements, as will be described further below. The track flanges 22 are each engaged by three rollers 36, 38 and 40 arranged to contact respectively the upper surface of the flange, its side edge and its lower surface, as shown in Fig. 3A, in order to provide both lateral and vertical stability and to maintain the interengagement of the tracks 22 despite any tendency for the bell-cranks 18 to be swung independently by forces acting upon the flap 10. However, the axles of rollers 40 compositely form a bell-crank pivot, the forward arms of the bell-cranks 18 being journalled on this pivot such that the angle defined between such bell-crank arms and the portion of track engaged by their followers may vary without binding of the rollers.

In addition to the above described mechanism for supporting and guiding the flap for bodily movements between its projected and retracted positions, the flap control mechanism further comprises means to progressively increase its angular deflection downward as it moves toward projected position, preferably in the manner seen from a further comparison of the retracted positions shown in Fig. 2. Such means controlling the flap angle in relation to bodily movement preferably comprises a control arm 42 connected rigidly to the flap 10 and projecting forwardly therefrom to be guided by a guide track 44, the end of such arm 42 having a carriage or follower 46 which rides on the track 44. During flap extension and retraction, this track is normally held stationary, although it can be shifted about the pivot 47 in a manner to be subsequently described. As shown in Fig. 3B, the track 44 is also of double construction, although formed by oppositely projecting flanges on the lower edge of the single structural plate 48. The follower 46 includes two groups of rollers, one on each side of the plate 48, and each group includes three rollers 50, 52 and 54 engaging respectively, the top, side, and bottom surfaces of the corresponding track flange 44. As in the case of the bell-crank arms 18 guided from the curved tracks 22, the flap control arm 42 is constrained by its rollers to follow the track 44 despite the effect of wind forces on the flap tending to change its angle of attack. The aligned axes of the axles 53 of the rollers 54 serve as a pivot for the forward end of the control arm 42 such that its angular relationship to the track portion of the plate 48 can vary without binding of the rollers.

It will be seen from the drawings that the tracks 22 and 44 in the illustrated form are substantially of the same shape. This is not essential in a particular design, however, because as will be evident, a particular trajectory of the hinge axis of the flap will be established by a differently shaped track if the lengths of the bell-cranks 18 are changed, for example. Similarly, the shape of the track 44, to produce a given flap angle for each position of the flap in its bodily movement between extreme positions, will, for example, depend upon the length of the control arm 42. The shapes and relationship of the tracks in a given instance will depend upon aerodynamic considerations and mechanical clearance of the flap from other parts of the wing during flap extension and retraction. If, however, the pivots 39, for the forward ends of the bell-cranks 18 formed by the axles of rollers 40, are substantially aligned with the pivot axes for the forward ends of arms 42 formed by the axles 53 of the rollers 54 when the plates 48 are in their normal positions, the tracks 22 can be made in substantially the same shape as the tracks 44. In that event no appreciable relative movement will occur between the bell-crank 18 and the flap during projection and retraction.

The flap 10 is moved between its projected and retracted positions by suitable mechanism such as the coacting screw jacks 56. These are extended and retracted in their respective actuating nut units 58 driven in common by a power shaft 55 which extends spanwise of the wing as shown in Fig. 1, being a continuation of the drive shaft 119 which is driven by a motor or other suitable power source 117 supported upon the rear spar 37 and driving the bevel gears 118. At their extreme rearward ends the screw rods 56 are pivotally interconnected with the lever arms 60, through the pivotal trunnion fitting 61, the arms 60 being rigidly connected at their base ends to the rotatable shafts 20 comprising the hinge axis of the flap 10. The top of the slot is apertured for clearance of these lever arms 60 which project generally forwardly and upward to offset locations above the general flap surface for connection to the screw jacks 56 through the trunnion fittings 61, as shown in Fig. 2. Inasmuch as the lever arm 60 and the bell-crank 18 are each rigidly connected to the shaft 20, and the flap is rotatable on these shafts by swinging of the levers 42, bodily extension and retraction of the flap, and angular positioning thereof with respect to such shafts are independently controlled.

The separate means controlling flap angle during extension and retraction is also independently movable in the projected position of the flap to enable "spilling" the flap by controlled amounts in accordance with the operation of the lateral controls of the airplane. In a control mechanism which separates the functions of positioning the flap bodily from positioning it angularly, the cam track arrangement, including the cam track 44, the follower 46 and the control arm 42, serve to effect an advantageous coordination with the lateral controls, because it is merely necessary in such case to mount the cam track structure for movement by its forward end to swing the control arm 42 in order to vary the flap angle. In the preferred embodiment which has been disclosed in Figs. 1, 2 and 3, the lower forward edge of the cam track 44 and its supporting web plate 48 is pivoted on the support 47 supported from the wing spar 37, and is swung on the axis of this pivot by a double-acting hydraulic power boost unit 95 pivotally connected to the web plate 44 at the pivot 49 adjacent the upper portion of the track assembly 44. All of the foregoing mechanisms and structures have been shown and described in the above-referred-to application Serial No. 165,296, and as indicated above, the present invention is directed to improved means and mechanisms for coordinating the flap movements in accordance with the operation of the lateral controls of the airplane.

The heart of this improved aileron and flap coordinating mechanism lies in the clutch and disconnecting unit 62 which is shown in Fig. 1 located above the leading portion of the flap 10 and more particularly shown in detail Figs. 4 to 10, inclusive. Referring now to Fig. 4, the clutch unit 62 is enclosed within a cylindrical bottom housing or lower casing portion 63 and a cap or cover portion 64, both portions having flanges apertured for the attachment bolts 63a. Both portions 63 and 64 have opposite and vertically aligned bearings 65 and 66 housed therein for the journalling of the rotary clutch and disconnect portions of the unit. A carriage assembly drive member 67, shown in detail in Fig. 10, is provided with obliquely mounted rollers 68 journalled upon the pivot pins 68a, the drive member 67 in turn being attached to the vertical drive shaft 89 by the transverse attachment bolt 69. Mounted for rotation upon the outer cylindrical surface of the enlarged portion of the drive shaft 89 and internally of the lower anti-friction bearing 65, there is disposed a separately rotatable assembly comprising the cam track assembly 70, the yoke and cylinder unit 71 and the lower arm assembly 74. The latter is attached to the cam track plate 70 by the attachment bolts 74a and the cam track plate 70 is similarly attached to the yoke and cylinder unit by the bolts 70a.

The yoke and cylinder 71 is provided within its upper portion with a vertically disposed cylinder 72 aligned with the axis of the drive shaft 89. This cylinder is provided with a passageway 73 which provides communication between the interior of the cylinder 72 and the hydraulic line 91 connected to the aileron hydraulic boost 90 which will hereinafter be more fully described. It will be understood that the rotatable assembly comprising the arm assembly 74, the cam track 70 and the yoke and cylinder unit 71 are restrained in the axial direction by the shouldered portions engaging the bearings 65 and 66, but this assembly is free to rotate about the vertical axis of the drive shaft 89 and the aligned axis of the cylinder 72, except as the rotation is limited by the stop-bolt 64b, Fig. 4. Within the latter cylinder, there is reciprocably slidable a piston 72a which bears down at its lower end against the top of the drive shaft 89 and the attached drive member 67. The piston 72a is shown in Fig. 4 in its normal position in which it is maintained in its downward position due to the pressure exerted through the hydraulic line 91 and the passage 73 and within the upper portion of the chamber 72. Accordingly, when the hydraulic booster unit 90 for the actuation of the aileron 11 is in its normal operating condition, the higher fluid pressure within the chamber 72 maintains the piston 72a in its down or normal position in which the rollers 68 of the drive member 67 are in firm engagement with the cam track 70c of the cam track element 70. In the event the pressure within the chamber 72 falls below a predetermined level due to inoperativeness of the aileron boost, the drive member 67 in being rotated by a rotational force applied to the drive element 89 would cause the latter to rise vertically as the rollers 68 climb the higher portions of the cam track 70c, until limited by the stop pin 79 (Fig. 8) and the piston 72a is pushed upwardly within the cylinder 72.

As more clearly shown in Figs. 5, 6 and 7, the arm assembly 74 is provided with a vertical pin 75 upon which is rotatably carried the roller 75a which is rotatable about the vertical axis of the drive shaft 89 with the driven assembly 70—71—74 as it may be positively driven by the clutch means comprising the rollers 68 engaging the troughs of the cam tracks 70c into which they are held in firm engagement by the normal operating fluid pressure within the chamber 72 exerting itself downwardly upon the piston 72a. The roller 75a of the pin 75 is engageable with a Geneva mechanism 76 which is provided with an open ended slot or bifurcated portion 77 and is fixed to the vertical pivot shaft 78. The arm member 74 is recessed as at 74b to permit clearance of the ends of the bifurcated portions of the Geneva mechanism 76 as may be seen in Fig. 7. The Geneva mechanism 76 is fixedly attached to the pivot 78 which in turn is fixedly attached to the external lever arm 108 which transmits movement to the above-mentioned flap boost actuating cylinder 95, which in turn imparts the "spilling" movement to the movable track 44, as will hereinafter be more fully explained.

As shown in Figs. 1 and 3, the aileron 11 is rotatable to positions above and below its normal or neutral position about its hinge axis 11a by suitable hydraulic control of the aileron boost unit 90 through the fluid lines 92, the boost unit 90 being pivotally supported at 93 and pivotally connected to the aileron horn at 94. As the aileron is moved either upwardly or downwardly, its movement is transmitted to the clutch and disconnect unit 62 through the mechanism 81 to 89, inclusive. This mechanism includes an aileron horn 81 fixedly attached to the aileron 11 for rotation about its hinge axis 11a and pivotally connected to the push-pull rod 82, in turn pivotally connected to the bell-crank 83 pivotally mounted on the bracket 84 and thence to the push-pull rod 85. The opopsite terminal of the latter is similarly pivotally connected to a further bell-crank 86 which is also connected to the chordwise extending push-pull link or rod 87 which is pivotally connected to the lever arm 88 fixedly attached to the above-mentioned drive portion 89 of the clutch unit 62.

Accordingly, it will be noted that as the aileron 11 is rotated downwardly about its hinge axis 11a, the shaft 89 is caused to rotate in a counter-clockwise direction as viewed looking downwardly, and alternatively, as the aileron is rotated upwardly from the normal position shown in Fig. 3, the push-pull rod 87 is caused to be translated rearwardly imparting a clockwise rotation to the drive shaft 89, as viewed looking downwardly. This mechanism is shown in the normal or neutral position of the aileron in Fig. 3, and in Fig. 5 the rod 87 and the lever arm 88 are shown in a position corresponding to a down position of the aileron. In Fig. 6, the same elements 87 and 88 are shown in a position corresponding to an upward deflection of the aileron to a predetermined angle which has been found to be satisfactory at 6° up. In this position of the arm 88 and with the aileron boost pressure effective to keep the clutch elements 67—70 in engagement, the arm element 74 has been rotated such that the roller 75a has just entered the mouth of the slot 77 of the Geneva mechanism. In Fig. 7, the elements 87 and 88 have been further rotated in the clockwise direction due to further upward movements of the aileron 11 to its full up position which for purposes of the present arrangement has been set at 18° up-aileron.

It will, accordingly, be noted that the first 6° of upward deflection of the aileron from its neutral position is absorbed by the lost-motion effect of the rotating roller 75a before it engages the Geneva mechanism 77. Due, however, to the angularity of the slot 77 in the Geneva mechanism with respect to the arcuate path of the roller 75, the latter initially imparts a small corresponding rotation of the pivot 78 in the counterclockwise direction. But as the deflection of the aileron increases above the 6° up position, the rotation of the pivot shaft 78 gradually increases until it reaches the maximum at the "full-up" or 18° up position of the aileron corresponding to the position of the elements shown in Fig. 7. Alternatively, it will be noted that in the event the normal operating pressure within the aileron boost 90, the conduit 91 and the cylinder 72 falls below a predetermined level, the piston 72a would permit the drive assembly 67—89 to be disengaged and to rotate freely without positive engagement of the driven assembly 70—71—74, resulting in upward movement of the drive assembly 67—89 and disengagement of the clutch means 67—70 without any rotation of the roller 75a. The arrangement of the aileron actuating mechanism 87—88 is such that it permits vertical translation of the arm 88 with the shaft 89.

Referring again to the hydraulic boost actuating unit 95 for the movable track assembly 44 to which it is pivotally connected at 49, and which track 44 is pivotally mounted upon the wing for rotation about the axis of the pin 47, this boost may be similar in design to that shown in Reissue 22,728 which issued to Burton et al. for a control surface boost device, and additionally incorporating a by-pass valve. Inasmuch as this boost unit may be any one of a number of available types, it has not been deemed necessary to show in greater detail, other than to state that beneath the main piston-cylinder portion it may contain a metering valve which is connected to the metering valve arm 98 shown in Fig. 3. Also within the housing of the unit 95 and below the metering valve therein, there may preferably be included a further valve unit composed of a valve piston, a ball valve unit and a spring-pressed plunger for use in by-passing fluid through the boost unit upon failure of this part of the cylinder system when insufficient hydraulic pressure exists to move the boost piston. The latter valve unit will by-pass fluid by interconnecting inlet and return passages of the metering valve. It will be understood that hydraulic system pressure is admitted to one side of the valve piston and if sufficient pressure exists, it forces the valve piston in one direction against the ball, moving the spring-pressed plunger in the same direction and closing off the flow between the inlet and return passages of the metering valve.

As stated above, the flap 10 is suspended at its hinge axis 20 at a point aft of its center of pressure, and aerodynamic pressures acting upon it tend to turn the flap trailing edge down, and in so doing will tend to return the track 44 to its up position. Upon loss of pressure in the supply line to the track boost unit 95, when the flap is "spilled" by this boost unit, the forces tending to lower the flap trailing edge will create differential pressures across the boost piston which will force the valve pistons away from the ball and allow by-pass flow across the boost system to allow the return of the track 44 to its up or normal "unspilled" position. The track boost unit 95 is pivotally mounted upon the rear spar 37 of the wing 12 at the pivot 96 and its forward portion is provided with a bifurcated member 97 which embraces the web plate 48 of the track unit 44 and provides for the pivotal connection 49. The unit is also provided, in addition to the metering valve arm 98, with a metering valve turnbuckle adjustment 99, and a spring cartridge bungee unit 100. The outer terminal of the metering valve arm 98 is pivotally connected to the push-pull rod 101 which in turn is connected to an arm of the lever 102 fixed to the vertical shaft 103 having a further arm 104 at its lower terminal. The latter is pivotally connected to the push-pull rod 105, in turn connected to the bellcrank 106 the opposite terminal of which is pivotally connected to the chordwise extending push-pull rod 107, pivotally connected to the arm 108, which is fixedly attached to the above-mentioned vertical shaft 78 of the Geneva mechanism. Accordingly, it will be noted that as the Geneva mechanism 76 is engaged by the roller 75a and the shaft 78 is correspondingly rotated in the counterclockwise direction this movement is translated into correspondingly rearward movement of the push-pull rod 101 initiating admission of fluid through the hydraulic lines 109 into the boost unit 95 such that it causes separation of its terminal pivots 49 and 96 and downward rotation of the track 44 about its pivot 47, thereby causing depression of the flap arm 42 and "spilling" of the flap 10 as indicated by the construction lines in Fig. 2.

Referring again to Figs. 1 and 3, it will be recalled that the flap 10 is moved between its extended and retracted positions by the power source 117 driving the bevel gears 118 and the spanwise extending shaft 119 which is continued through the unit 58 into the drive shaft 55 passing through the opening 48a in the webs 48. As shown in these figures, the clutch unit 62 is interconnected with an adjacent flap extension screw 56 which has operatively mounted on its forward end a rack or toothed fitting 110 in engagement with the pinion or toothed gear sector 111. The latter is pivotally mounted upon the aircraft wing structure such that the attached lever translates forward movement of the rack 110 into like forward movement of the push-pull rod 113 through the lever 112. This rearward movement causes rocking of the horizontal shaft 114 with its attached lever portions and downward translation of the link 115, causing clockwise rotation (looking forward) of the lever arm 116 about the axis of its chordwise pivot 116a as viewed in Fig. 3. This movement of the flap actuating screw 56 and its associated mechanism is initiated by full retraction of the flap into its normal forward position within the wing profile and results in upward movement of the free end of the lever arm 116, which as may be seen in Fig. 4 imparts corresponding upward movement to the axially shiftable drive assembly 67—89 of the clutch unit 62, thereby overcoming the normal aileron boost pressure within the cylinder 72 and disengaging the clutch elements 67—70 such that upward deflections of the aileron beyond the 6° up position causing movement of the rod 87, the lever 88 and rotation of the drive assembly 67—89, does not result in any similar positive rotation of the driven assembly 70—71—74 due to disengagement of the clutch, and thereby does not result in any engagement or movement of the Geneva mechanism, or concurrent "spilling" of the flap. Accordingly, it will be seen that the mechanism shown and described provides a positive acting means for prevention of "spilling" of the track 44 and the flap 10 while the flap is in its retracted position and the clutch elements of the unit 62 are disconnected or disengaged.

In the retracted position of the flap, and the disengaged condition of the clutch elements 67—70, the spring cartridge 100 (see Fig. 3) located alongside the flap boost unit 95, will act upon the metering valve within this unit to return the track 44 to "unspilled" position and will so move the linkage 101 to 106, inclusive, extending between the flap boost 95 and the clutch unit 62 such that the Geneva gear mechanism 76 will return to the position where the flap is not "spilled." As has been noted above, the lost-motion is provided by the Geneva gear mechanism between the zero and 6° up aileron position but when the aileron arrives at the 6° up position, the flap commences to spill gradually, and this "spilling" movement is not proportional to the movement of the aileron because of the action of the Geneva gear mechanism. This mechanism has been utilized advantageously in the present mechanism in that small movements of the aileron require relatively little "spilling" of the flap, but with greater movements of the aileron a proportionately greater "spilling" of the flap is desirable, and is obtained.

On the other hand, as the flap actuating motor 117 may be actuated for extension of the flap through the jack screws 56, the mechanism 110 to 116, inclusive, is operated in the opposite direction permitting the vertically movable units 67 and 89 of the clutch unit 62 to be lowered under the influence of the aileron boost pressure exerted upon the piston 72a within the cylinder 72. Under these conditions, any movement of the aileron between 6° up and 18° up will cause "spilling" of the flap through the Geneva mechanism of the clutch unit 62.

While it will be noted that the coordinating mechanism, which has been shown and described as a preferred embodiment for explanatory purposes only, accomplishes all of the objectives of the present invention, and it will also be obvious that the novel functions which this coordinating mechanism has obtained can be accomplished by other forms and equivalent mechanism. In this connection, a simpler form of flap supporting mechanism has been shown in Figs. 10 and 11 of the above-referred-to Butler and Cook Patent No. 2,620,147 and it should also be noted that the axes of the pivots 19 between the carriage arms 14 and the bell-cranks 18 need not be aligned with the pivots of the trunnion fittings 61 between the screw jacks 56 and the lever arms 60. The type of linkage which has been disclosed utilizing the bell-cranks 18 in conjunction with the curved tracks 22 obtains a desired amount of lowering of the flap, which produces the desired change in camber along with an increase in sustaining surface area. This obviates the necessity of a longer carriage track of increased slope and in the arrangement shown there is provided a very satisfactory installation in a highly swept-back wing for a relatively high speed airplane.

Other forms and modifications of the present invention, which may become apparent to those skilled in the art after reading the foregoing description, are intended to come within the scope and spirit of this invention as more particularly set forth in the appended claims.

We claim:

1. In an aircraft having a wing, an aileron operatively mounted upon said wing, means connected to said aileron for operating said aileron, a flap mounted for extension and retraction with respect to said wing, means including a power-actuated jack screw connected to said flap for extending and retracting said flap, coordinating means including a clutch device having a rotatable and translatable portion operatively connected to said aileron, said clutch device having a rotatable portion operatively connected to said flap extending and retracting means for automatically decreasing the angle of attack of said flap while in an extended position upon upward deflection of said aileron beyond a predetermined angle and lost-motion means connected to said flap arranged to impart translation to said first portion whereby actuation of said aileron operating means does not impart movement to said flap while in the retracted position.

2. In an aircraft having a wing, an aileron operatively mounted upon said wing, means connected to said aileron for operating said aileron, a flap mounted for extension and retraction with respect to said wing, and means including a power-actuated jack screw connected to said flap for extending and retracting said flap, coordinating means including a clutch device having a first rotatable and translatable portion operatively connected to said aileron and to said flap extending and retracting means arranged upon upward deflection of said aileron to automatically decrease the angle of attack of said flap while in an extended position, said clutch device having a second rotatable portion connected to said flap, and means operatively connected to said flap extension means and to said first portion for translating said portion upon flap retraction to prevent said decrease in angle of attack of said flap.

3. In an aircraft wing, an aileron operatively mounted upon said wing, means connected to said aileron for operating said aileron, a flap mounted for extension and retraction with respect to said wing, mounting means including a track for rocking said flap into a high lift position as said flap is extended, means for extending and retracting said flap along said mounting means, coordinating means including a clutch unit operatively connected to said aileron and to said flap mounting means for rocking said mounting means for automatically decreasing the angle of attack of said flap while in an extended position upon upward deflection of said aileron beyond a predetermined angle, and means operatively connected to said flap retracting means and to said clutch unit actuated by operation of said flap retracting means for disconnecting said clutch unit and preventing flap angle movement while said flap is in the retracted position.

4. In an aircraft wing having an aileron and a flap, control mechanism comprising means carried by the wing pivotally supporting said flap and guiding it for translative movement relative to the wing between projected and retracted positions, flap tilting means carried by the wing engageable with said flap and operable to control positive tilting of the flap about its pivot relative to the wing during translation of the flap, and control means including a clutch device operatively connected to said aileron, to said tilting means and to said flap control mechanism, said clutch device operable in the extended position of said flap to actuate said tilting means to reduce the angle of incidence and impart negative tilting to the flap in a given relative position below that normally effected by said flap tilting means during said translative movement, said negative tilting of said flap initiated by predetermined upward deflection of said aileron as transmitted through said operative connections to said clutch device.

5. In an aircraft wing having an aileron and a flap, flap control mechanism comprising means carried by the wing pivotally supporting said flap and guiding it for bodily movement relative to the wing between projected and retracted positions, flap tilting means carried by the wing engageable with said flap and operable to control tilting of the flap about its pivotal support relative to the wing during bodily movement of the flap, pivotal means movably supporting and guiding said flap tilting means for movement to alter the angle of incidence of said flap in its projected position while maintaining operative the engagement between said flap and said flap tilting means, and means including a shiftable clutch device operatively connected to said aileron and to said flap operable to actuate said pivotal means to effect such flap angle of incidence reduction movement upon predetermined upward deflection of said aileron.

6. In an aircraft wing having a flap, an aileron, a stationary track carried by said wing, an arm having one end pivotally connected to said flap, a follower carried by an opposite end of said arm guided by said track for movement therealong during projecting and retracting translation of said flap, a second track swingably mounted upon said wing, and a member mounted on said flap engaging said second track for guidance therealong to control the angle of flap incidence during projection and retraction of said flap, the improvement comprising coordinating control means operatively connected to said aileron, to said flap and to said second track operable to swing said second track to alter the angle of incidence in a given translative position of said flap upon predetermined upward deflection of said aileron, said coordinating control means including an axially shiftable and rotatable element operatively connected to said aileron for rotary movement therewith, a rotatable element carrying a cam track engageable by said shiftable element in operative engagement with said swingably mounted second track for swinging of said track when said shiftable element has been rotated beyond a predetermined position initiated by said predetermined upward position of said aileron.

7. In an aircraft wing having a flap, an aileron, a stationary track carried by said wing, an arm having one end pivotally connected to said flap, means operably connected to said flap for the retraction and extension thereof, a follower carried by an opposite end of said arm guided by said track for movement therealong during projecting and retracting translation of said flap, a second track swingably mounted upon said wing, and a member mounted on said flap and carrying a follower element engaging said second track for guidance therealong to control the angle of flap incidence during projection and retraction of said flap, the improvement comprising coordinating control means operable to swing said second track to alter the angle of incidence of said flap in a given translative position thereof upon predetermined upward deflection of said aileron, said coordinating control means including an axially shiftable rotatable member operatively connected to said aileron for movement therewith, a rotatable element carrying a cam track engageable by said shiftable rotatable member in operative engagement with said swingably mounted second track for swinging of said track when said shiftable rotatable member has been rotated beyond a predetermined position initiated by said predetermined upward position of said aileron, and means interconnecting said shiftable rotatable member with the said flap retracting means operable to axially shift said shiftable rotatable member for disconnection from said rotatable element to prevent flap incidence increasing movements while said flap is in its retracted position.

8. In an aircraft having a wing, an aileron operatively mounted upon said wing, means for operating said aileron, a flap mounted for extension and retraction with respect to said wing, means for extending and retracting said flap, and coordinating means operatively connected to said aileron and to said flap extending and retracting means for automatically decreasing the angle of attack of said flap while in its extended position upon upward deflection of said aileron beyond a predetermined angle, said coordinating means including a relatively fixed casing member, a rotatable driven element journalled within said casing member, a driving element rotatively and reciprocably journalled within and engageable with said rotatable driven element, means interconnecting said aileron and said driving element for rotating said driving element for decreasing the angle of attack of said flap as said aileron is deflected upwardly through predetermined angles, and further means connected with said extension and retraction means engageable with said driving element to reciprocably move said driving element for its disengagement from said driven element to prevent such automatic decrease of angle of attack of said flap at such times as said flap is not in its fully extended position.

9. In an aircraft having a wing, an aileron operatively mounted upon said wing, fluid boost means for operating said aileron, a flap mounted for extension and retraction with respect to said wing, means for extending and retracting said flap, and coordinating means operatively connected to said aileron and to said flap extending and retracting means for automatically decreasing the angle of attack of said flap while said flap is in its extended position upon upward deflection of said aileron beyond a predetermined angle, said coordinating means including a casing member, a rotatable driven element journalled within said casing member, a driving element rotatively and reciprocably journalled within and engageable with said rotatable driven element, means interconnecting said aileron and said driving element for rotating said driving element as said aileron is deflected upwardly a predetermined amount, means interconnecting said driving element with said flap retracting means for reciprocating said driving element into a disengaged position with respect to said driven element for preventing said automatic decrease of angle of attack of said flap in the retracted position of said flap, and conduit means connecting said aileron fluid boost means with the interior of said casing arranged to urge said driving and driven elements into engagement when said fluid boost is available for aileron operation.

10. In an aircraft having a wing, an aileron operatively mounted upon said wing, means for operating said aileron, a flap mounted for extension and retraction with respect to said wing, tilting means mounting said flap upon said wing for changing the angle of attack of said flap, means for extending and retracting said flap, and coordinating means operatively connected to said aileron and to said flap extending and retracting means for automatically decreasing the angle of attack of said flap while said flap is in its extended position upon upward deflection of said aileron beyond a predetermined angle, said coordinating means including a casing member, a rotatable driven element journalled within said casing member, a driving element rotatively and reciprocably journalled within said rotatable driven element, mechanism operatively interconnecting said aileron and said driving element for rotating said driving element for decreasing the angle of attack of said flap as said aileron is deflected upwardly beyond a predetermined angle, operating mechanism connecting said driving element with said flap retracting means for reciprocating said driving element into a disengaged position with respect to said driven element for preventing decrease of angle of attack of said flap in the retracted position of said flap, means connecting said aileron operating means with said coordinating means for urging the engagement of said driving and driven elements in the operative condition of said aileron operating device, and means interconnecting said driven element with said flap angle of attack decreasing and tilting means including a lost-motion Geneva mechanism.

References Cited in the file of this patent

UNITED STATES PATENTS

| Number | Name | Date |
|---|---|---|
| Re. 19,651 | Congdon | July 23, 1935 |
| 1,798,914 | Thurston | Mar. 31, 1931 |
| 2,007,086 | Hall | July 2, 1935 |
| 2,070,006 | Eaton, Jr., et al. | Feb. 9, 1937 |
| 2,147,360 | Zaparka | Feb. 14, 1939 |
| 2,218,822 | Joyce | Oct. 22, 1940 |
| 2,479,619 | Hilton et al. | Aug. 23, 1949 |